US008713209B2

(12) United States Patent
Harris

(10) Patent No.: US 8,713,209 B2
(45) Date of Patent: Apr. 29, 2014

(54) SYSTEM, APPARATUS, AND METHOD FOR FAST STARTUP OF USB DEVICES

(75) Inventor: Steven F. Harris, La Jolla, CA (US)

(73) Assignee: QUALCOMM Incorporated, San Diego, CA (US)

(*) Notice: Subject to any disclaimer, the term of this patent is extended or adjusted under 35 U.S.C. 154(b) by 311 days.

(21) Appl. No.: 12/353,214

(22) Filed: Jan. 13, 2009

(65) Prior Publication Data
US 2010/0180051 A1    Jul. 15, 2010

(51) Int. Cl.
G06F 3/00    (2006.01)
G06F 13/00   (2006.01)

(52) U.S. Cl.
USPC ............ 710/14; 710/2; 710/5; 710/8; 710/11; 710/15

(58) Field of Classification Search
None
See application file for complete search history.

(56) References Cited

U.S. PATENT DOCUMENTS

| 6,658,489 | B1* | 12/2003 | Asselin ................... 719/327 |
| 6,742,055 | B2* | 5/2004 | Matsunaga ................ 710/10 |
| 7,890,664 | B1* | 2/2011 | Tao et al. ................. 710/8 |
| 2002/0077764 | A1* | 6/2002 | Milios et al. ............. 702/122 |
| 2003/0046447 | A1 | 3/2003 | Kouperchliak et al. |
| 2004/0189809 | A1* | 9/2004 | Choi ..................... 348/207.1 |
| 2005/0120343 | A1* | 6/2005 | Tai et al. ................. 717/173 |
| 2006/0133275 | A1* | 6/2006 | Dabagh et al. ............ 370/230 |
| 2007/0228139 | A1 | 10/2007 | Wang et al. |
| 2008/0005370 | A1* | 1/2008 | Bolan et al. ............. 710/8 |
| 2008/0189349 | A1* | 8/2008 | Krig .................... 709/200 |
| 2009/0222907 | A1* | 9/2009 | Guichard ................ 726/17 |
| 2010/0146279 | A1* | 6/2010 | Lu et al. ................ 713/172 |
| 2011/0016280 | A1* | 1/2011 | Chang et al. ............. 711/161 |
| 2011/0099311 | A1* | 4/2011 | Kimura ................. 710/110 |

FOREIGN PATENT DOCUMENTS

| JP | 2001265706 A | 9/2001 |
| JP | 2006185012 A | 7/2006 |
| WO | WO2004008313 | 1/2004 |

OTHER PUBLICATIONS

International Search Report and Written Opinion—PCT/US2010/020949, International Search Authority—European Patent Office—Aug. 5, 2010.
Invitation to Pay Additional Fees—PCT/US2010/020949 International Search Authority—European Patent Office—Mar. 5, 2010.
Taiwan Search Report—TW099100821—TIPO—Feb. 7, 2013.

* cited by examiner

Primary Examiner — Scott Sun
(74) Attorney, Agent, or Firm — Ramin Mobarhan

(57) ABSTRACT

Exemplary embodiments are directed to fast enumeration of a device in a USB system including a USB device and a USB host. The USB device includes two device descriptors, a memory for holding firmware for operation of the USB device, and a controller for executing the firmware. A first device descriptor is for enumerating the USB device in a firmware-loading mode and a second device descriptor is for enumerating the USB device in an operational mode. The USB host controls a first enumeration of the USB device using the first device descriptor. After the first enumeration, the USB host receives a re-enumerate indicator from the USB device and controls a second enumeration of the USB device using the second device descriptor.

32 Claims, 5 Drawing Sheets

SYSTEM, APPARATUS, AND METHOD FOR FAST STARTUP OF USB DEVICES

BACKGROUND

The Universal Serial Bus (USB) is a standard peripheral interface for attaching computers to a wide variety of peripheral devices. These peripherals are generally referred to as functions, which may include hubs and devices, such as, keyboards, mice, cameras, monitors, modems, and many other peripherals.

Devices in a USB system connect to a USB host in a tiered star topology wherein each device connects to the USB host through one or more hubs. The USB system is a polled bus wherein a host computer includes a single USB controller that manages all communication on the bus and monitors the bus topology for changes due to devices being attached or removed.

Most bus transactions include three packets. The host controller sends a token packet describing the type and direction of the transaction, a device address, and an endpoint number. The USB device that is addressed recognizes its address from the token packet. Data is transferred either from the host to the addressed device or from the addressed device to the host based on the direction specified in the token packet. In most, cases, the destination of the data responds with a handshake packet indicating a receipt status for the transferred data.

While the USB system supports multiple peripherals connected to the bus, the USB protocol is a point-to-point protocol. In other words, a single host can send data to a single uniquely addressed device at a time. Thus, data for the various devices are time multiplexed so that each device can receive or transmit data during its time slot.

The USB system generally defines frames that are one millisecond long, within that frame, the USB system may allocated different time slots to many or all of the devices on the bus. Each device has a unique address so the device knows that data transmitted is for it, or supplies the unique address with data it sends so the host knows from which device the data is received.

When a USB device is first plugged in, it goes through an initialization, enumeration, and configuration process to set up the USB device for use by the USB host and client software thereon. This setup process may be quite lengthy for complex USB devices with a large amount of firmware, or other setup requirements. However, many operating systems impose certification requirements on how long a USB device can take to perform the setup process before it is available to the operating system.

There is a need for systems, apparatuses, and methods for performing a fast setup process to meet operating system requirements while still allowing complex configuration of USB devices.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

Exemplary embodiments of the present invention are directed to performing a fast USB setup process, which may include initialization, enumeration, and configuration of a USB device while still allowing a complex relatively long configuration process for the USB device.

Figure 1:
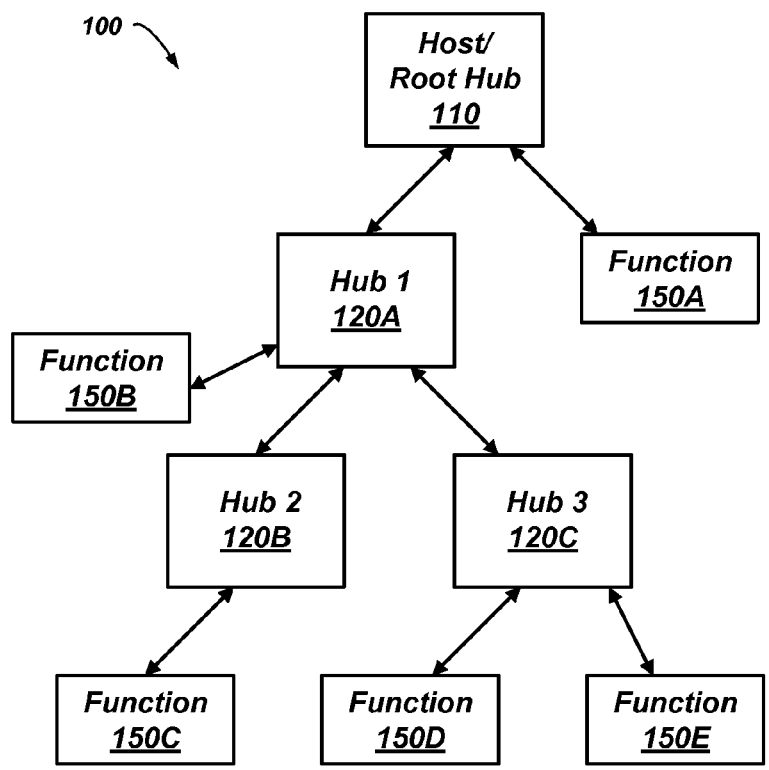
FIG. 1 shows a topology diagram for a USB system.

FIG. 1 shows a topology diagram 100 for a conventional USB system. A USB host 110 includes a root hub with multiple connection points. In FIG. 1, a first function 150A is connected at one connection point and a first hub 120A is connected to a second connection point. The first hub 120A includes multiple connection points. A second function 150B, a second hub 120B, and a third hub 120C are connected to the first hub 120A. The second hub 120B may include multiple connection points. A third function 150C is connected to the second hub 120B. The third hub 120C includes multiple connection points. A fourth function 150D and a fifth function 150E are connected to the third hub 120C.

The hubs function as repeaters by sending data received on its upstream port to each of its downstream ports and sending information from one of its downstream ports to its upstream port. At any given time, only one function or the host should be placing information on the bus. Thus, as an example, the host may send information destined for the fifth function 150E. The information flows through the first hub 120A and the third hub 120C on its way to the fifth function 150E.

A USB function is generally a USB device that provides a capability to a device. As examples, a USB function may be a USB device, a USB hub, a USB host controller, a USB transceiver, and the like.

USB hubs include status bits to report attachment and removal of USB devices on its ports. The USB host can query the USB hubs to determine the connection status for all devices in the topology and maintain a map of all the connected USB devices. When a USB device is removed from a port, the USB hub disables the port and reports the removal through the status bits. If the removed device is a USB hub, the host controller software will update the map to indicate that all USB devices that were connected to the removed USB hub are now disconnected.

USB data transfers occur between the host and specific endpoint on a USB device. Associations between the host and an endpoint are generally referred to as pipes. In general, data movement in one pipe is independent from data movement in other pipes. Thus, a given USB device may include multiple pipes and there may be a large number of pipes in the entire USB system.

The USB protocol supports four basic types of data transfer; control transfers, bulk data transfers, interrupt data transfers and isochronous data transfers. Control transfers are used to configure a device when it is attached and manage other device specific tasks, such as, for example, controlling other endpoints on the device.

Bulk data transfers are used for data that are generally bursty and do not include significant constraints on bandwidth or latency requirements.

Interrupt data transfers are used for data that may have low latency requirements, such as human perceptible data.

Isochronous data transfers use a pre-negotiated portion of the USB bandwidth for devices that require a substantially constant bandwidth and a low latency. Examples of such data are video and audio streaming data.

Figure 2:
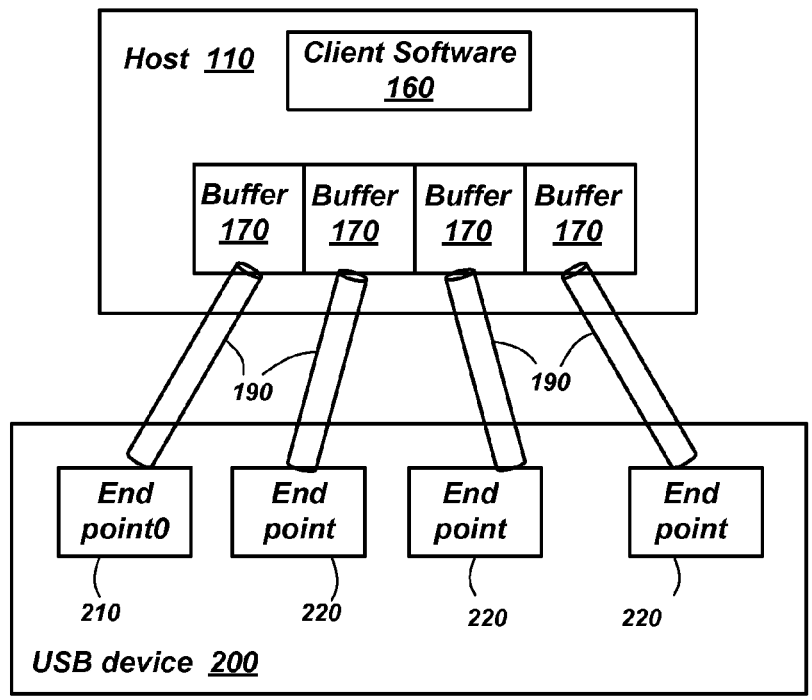
FIG. 2 shows a simplified block diagram of logical communication pipes in exemplary embodiments of the present invention.

FIG. 2 shows a simplified block diagram of logical communication pipes in exemplary embodiments of the present invention. A USB host 110 may include multiple buffers 170 feeding or receiving data for multiple pipes 190. Each pipe may be connected to a different endpoint (210, 220) within a USB device 200. Client software 160 within the host receives information from, or sends information to, the various buffers 170. Endpoint0 210 is for control transfers as is explained below. The USB device 200 may include other endpoints 220 for receiving and sending other information or controlling other functions.

A USB pipe 190 is a logical construct that represents the ability to move data between software on the USB host 110 via the memory buffers 170 to an endpoint (210, 220) on the USB device 200. There are two types of pipe communication modes. Stream data moving through a pipe has no USB-defined structure. Message data moving through a pipe includes some type of structure defined by the USB architecture.

Figure 3:
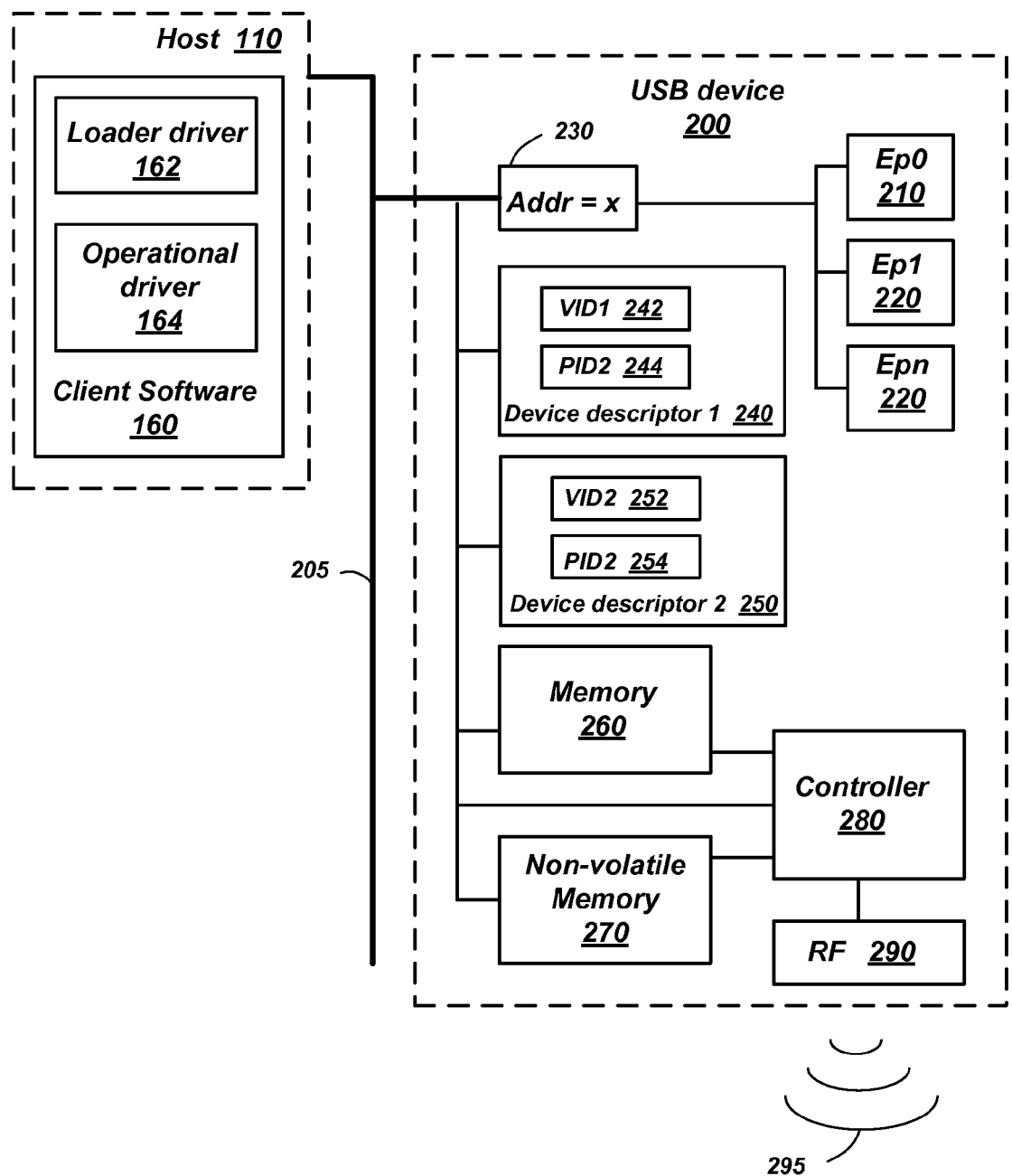
FIG. 3 shows a simplified block diagram of exemplary embodiments of the present invention.

FIG. 3 shows a simplified block diagram of exemplary embodiments of the present invention. FIG. 3 illustrates a USB system in a more functional representation, whereas FIG. 2 illustrates a USB system as a dataflow representation.

In FIG. 3, a USB host 110 is shown connected to a USB device 200, according embodiments of the present invention, through a USB bus 205. Of course, there may be many USB devices 200 connected at various levels as explained above for the USB topology 100 of FIG. 1. A USB device 200 includes an address register 230 and an endpoint zero 210 (also referred to herein as a default control endpoint 210). The USB device 200 may also include other endpoints 220.

An endpoint (210, 220) is a uniquely identifiable portion of the USB device 200. Each USB device 200 includes a collection of independent endpoints. Each USB device 200 includes a unique address assigned by the system and contained in the address register 230. In addition, each endpoint within a USB device 200 is given a specific address. Furthermore, each endpoint is unidirectional with data flow direction toward the host or a dataflow direction toward the endpoint. Thus, the host recognizes a given endpoint as a combination of the device address, the endpoint address, and the flow direction. The default control endpoint 210 is assigned the endpoint address zero and supports control transfers.

All USB devices 200 are required to include a default control endpoint 210 for both input and output. The USB system software uses the default control endpoint 210 to initialize enumerate, and configure the USB device 200. For example, a controller 280 may cooperate with the USB host 110 in performing the initialization, enumeration, and configuration process. In addition, the controller 280 may perform many other functions in an operational mode to perform that tasks for which the USB device 200 is designed.

As a non-limiting example, the USB device may be configured as a wide area network (WAN) device and include an RF module 290 with an antenna for communication through a wireless signal 295, as is known in the art.

The USB device 200 may include memory 260. As non-limiting examples, the memory may include software for execution by the controller, information related to enumeration and configuration, and information related to operational modes of the USB device 200.

The USB device 200 may also include non-volatile memory 270, such as, for example, Flash memory and Electrically Erasable Programmable (EEPROM) memory. As non-limiting examples, the non-volatile memory 270 may include software for execution by the controller, information related to enumeration and configuration, and information related to operational modes of the USB device 200.

Exemplary embodiments of the present invention include a first device descriptor 240 and a second device descriptor 250. The first device descriptor 240 includes a first vendor identifier 242 and a first product identifier 244. The second device descriptor 250 includes a second vendor identifier 252 and a second product identifier 254. For each device descriptor (240 and 250), the vendor identifier and product identifier form a unique combination for the USB host 110 to query in order to determine what type of device is connected to the USB bus 205. Of course, the first and second vendor identifiers (252 and 254) may be the same as long as the combination of vendor identifier/product identifier is different between the first device descriptor 240 and the second device descriptor 250.

Operating systems require devices to power up quickly. For example, for Windows Vista® all devices must perform system resumes from Advanced Configuration and Power Interface (ACPI) S3 state in two seconds or less. For complex USB devices 200, this requirement may be difficult to meet.

Many devices solve this problem by adding faster hardware to the device, by restricting or minimizing a software image for fast startup, or by restricting functionality on the device to achieve fast enumeration. Thus, most USB devices 200 only include a single device descriptor with a vendor identifier and a product identifier.

Embodiments of the present invention use a dual-enumeration process. A device can power up quickly if two enumerations are utilized, since the first enumeration can be designed such that minimal initialization occurs in a short amount of time (e.g., <500 milliseconds). This achieves the operating system requirement of fast startup and allows for system resume to complete. After the first enumeration, the device becomes fully functional in a first mode, and then starts a second enumeration process to become fully functional in a second mode.

Thus, embodiments of the present invention include two device descriptors (240 and 250) so the USB device 200 can be enumerated and configured in two different modes. These two different modes are a firmware-loading mode and an operational mode, as are explained more fully below with reference to FIGS. 4-6B. As a result, the USB host 110 may include separate client software 160 module for each of the two modes. Thus, the USB host 110 may include a loader driver 162 for controlling the firmware-loading mode and an operational driver 164 for controlling the operational mode.

FIG. 3 illustrates the device descriptors (240 and 250) as separate blocks. However, those of ordinary skill in the art will recognize that the device descriptors (240 and 250) may be implemented in many different forms. As non-limiting examples, the device descriptors (240 and 250) may be embodied as configurable switches within the USB device 200, as values stored in the non-volatile memory 270, or as values stored in non-volatile memory within the controller 280.

Figure 4:
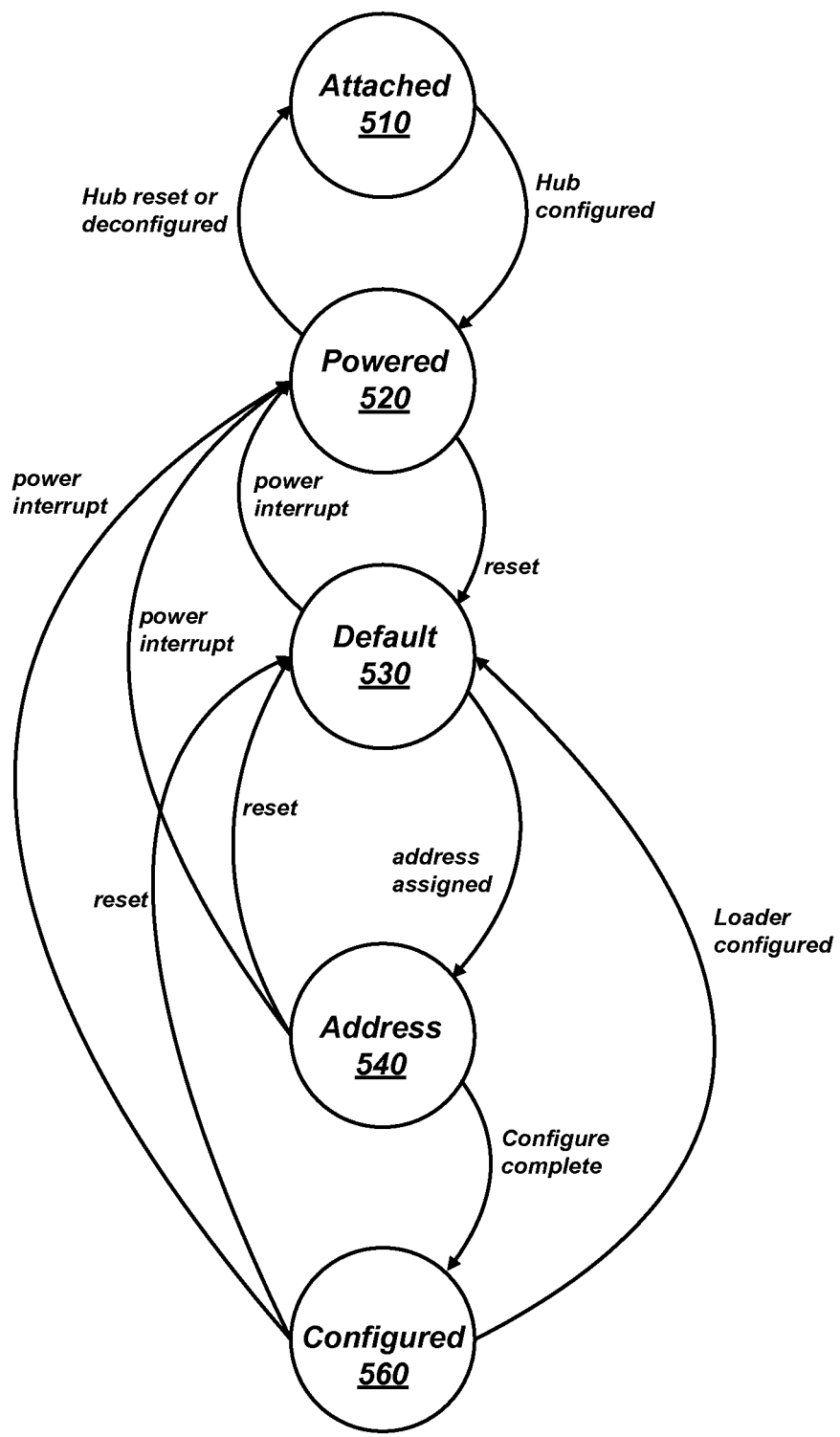
FIG. 4 shows a state diagram of an initialization process according to embodiments of the present invention

FIG. 4 shows a state diagram of an initialization and enumeration process according to embodiments of the present invention. The initialization and enumeration process is described with reference to both FIG. 3 and FIG. 4. When a USB device 200 is plugged in, it must go through this initialization and enumeration process before it may be used. When attached, the USB device 200 begins in the attached state 510. If the hub to which the USB device 200 is attached is properly configured, the USB device 200 transitions to a powered state 520 where power may be applied to the USB device 200. The USB host 110 initiates a reset to the USB device 200 and the device transitions to a default state 530.

In the default state 530, the USB device 200 responds to the default address (generally zero). Thus, the default control endpoint 210 is accessible at the default address to enable reading of device descriptors and perform general setup of the USB device 200. The USB host 110 then assigns the USB device 200 a unique address. With the unique address assigned, the USB device 200 transitions to an address state 540. After all configuration is complete, the USB device 200 transition to a configured state 560 ready to perform the operations for which it is designed.

Exemplary embodiments of the present invention go through two initialization and enumeration processes. Thus, the USB device 200 is first initialized and enumerated as a relatively simple USB device 200 that is configured for loading firmware into the memory 260 of the USB device 200. As a result, when the USB device 200 first enters the configured state 560 it is in the firmware-loading mode. When the loader is fully configured, the USB device 200 transitions back to the default state, based on a re-enumerate indicator, to be initialized and enumerated again as a relatively complex USB device 200 that will operate in the operational mode based on the loaded firmware. As explained earlier, the USB device 200 transitions through the default state 530, the address state, and the configured state again, except this time for the operational mode rather than the firmware-loading mode.

This transition from the configured state 560 at the end of the firmware-loading mode to the default state 530 based on the re-enumerate indicator to begin enumeration of the operation mode may be accomplished in a number of ways. As a non-limiting example, the USB 200 device may be partially reset such that it re-enters the default state 530, but remembers that is was previously configured in the firmware-loading mode. As another non-limiting example, while in the firmware-loading mode, the USB device 200 may send a request to the USB host 110 to be reconfigured in the operational mode.

A USB device 200 may have power interrupted. If a power interruption occurs from any of, the configured state 560, the address state 540, and the default state 530, the USB device 200 transitions back to the powered state 520 to be reset and reconfigured in the firmware-loading mode.

A USB device 200 may receive a reset from the USB host 110. If a reset occurs from any of, the powered state 520, the configured state 560, and the address state 540, the USB device 200 transitions back to the default state 530 to be reconfigured.

Figure 5:
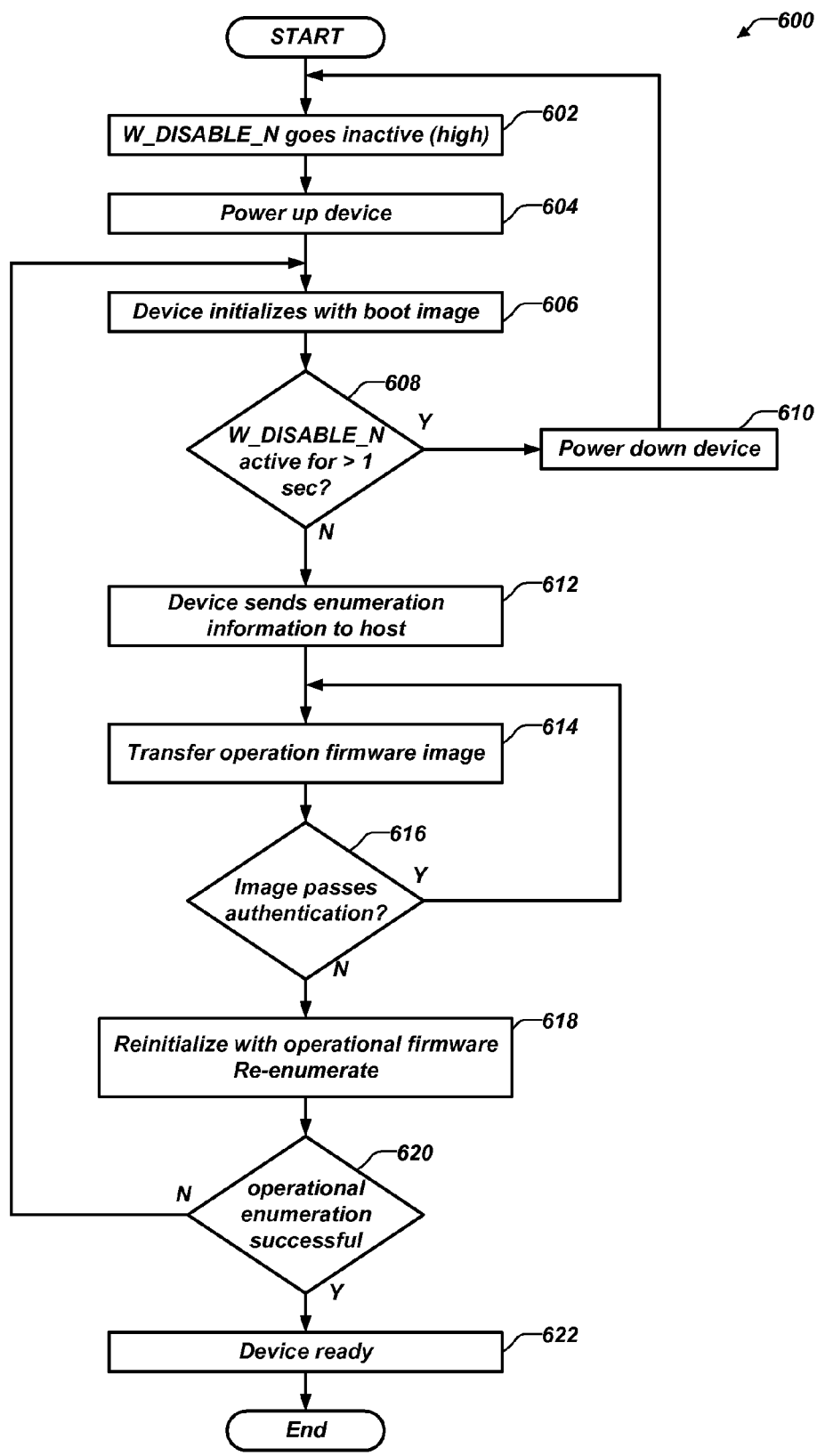
FIG. 5 is a simplified flow diagram of an enumeration process according to embodiments of the present invention.

FIG. 5 is a simplified flow diagram of a dual-enumeration process 600 according to embodiments of the present invention. Portions of this process may be described relative to configuration of a WAN device. However, those of ordinary skill in the art will recognize that the process may be performed with many other USB devices and those portions specific to a WAN device may be easily adapted to the other USB devices. In addition, many of the processes described in FIG. 5 have counterparts in the state diagram of FIG. 4 as will be apparent to those of ordinary skill in the art. Execution of the dual-enumeration process 600 is a cooperation between the USB host 110 and the USB device 200. Consequently, some operations are performed by the USB host 110 and some by the USB device 200 as will be apparent to a person of ordinary skill in the art.

FIGS. 3 and 5 are referred to in describing the dual-enumeration process 600, which begins at operation block 602 to test the state of an enabling signal. In a WAN device, W_DISABLE_N may be used to disable wireless communications, an application may reset the device, or the system on which the device is connected may remove power to the device. As a result, a test is performed to ensure that the device is prepared for communication before an enumeration process proceeds. If the USB device 200 is prepared for communication, operation block 604 powers up the USB device 200.

In operation block 606, the USB device 200 initializes with a boot image (also referred to herein as first firmware and software for the firmware-loading mode). This boot image may be part of the non-volatile memory 270, non-volatile memory on the controller 280, or other non-volatile memory on the USB device 200. Furthermore, portions of the boot image may reside on a hard drive on the host and be transferred to the USB device 200 as part of the configuration process. Depending on the embodiment, the boot image may be executed by the controller 280 from the non-volatile memory 270 or may be moved to the memory 260 for execution.

Decision block 608 tests to see if the W_DISABLE_N is active for greater than one second. In other words, the device has been disabled so there is no need to complete the enumeration process. If the USB device 200 is disabled, operation block 610 powers down the USB device 200 and control transfers back to operation block 602 to wait for the USB device 200 to be enabled. Operation block 608 and 610 are shown as occurring after operation block 606. However, those of ordinary skill in the art will recognize that disabling may be an interrupt driven event and may, therefore, occur from most locations in the process.

Operation block 612 continues the first enumeration process by, among other things, sending the first device descriptor 240 to the host.

After the device has been successfully enumerated in the firmware-loading mode, operation block 614 performs the operation of moving the firmware (also referred to herein as second firmware or operational firmware) to the memory 260. The operational firmware may reside on a hard drive on the host and be transferred to the memory 260 or may be on the non-volatile memory 270 of the USB device 200 and be transferred to the memory 260. For complex devices, the operational firmware may be large and this transfer process may be long. However, the USB device 200 has already been enumerated in the firmware-loading mode and thus has met the fast enumeration requirements of some operating systems.

After the operational firmware is downloaded, decision block 616 tests to verify that the operational firmware has downloaded successfully and passed an authentication process. If not, control returns to operation block 614 to download the operational firmware again.

If authentication is successful, operation block 618 performs a second enumeration process using the operational firmware and the second device descriptor 250. In this second enumeration process, the USB stack for the first enumeration is torn down and a new USB stack is built in an operational mode as part of the second enumeration.

Decision block 620 tests to see if the second enumeration was successful. If not, control transfers back to operation block 606 where the first enumeration is started again. If the second enumeration is successful, operation block 622 indicates that the USB device 200 is functional in its operational mode and the dual-enumeration process 600 is complete.

Figure 6A:
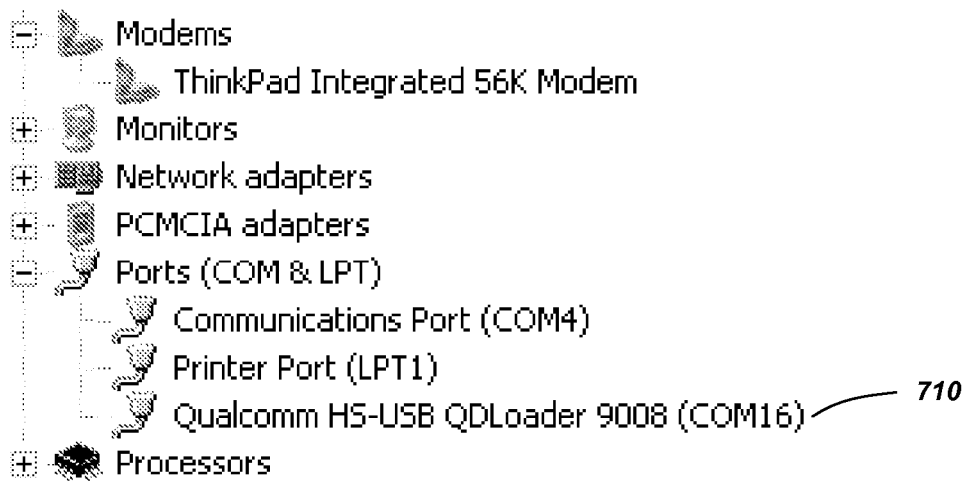
FIG. 6A shows an exemplary control panel displayed by an operating system after a first enumeration process.
Figure 6B:
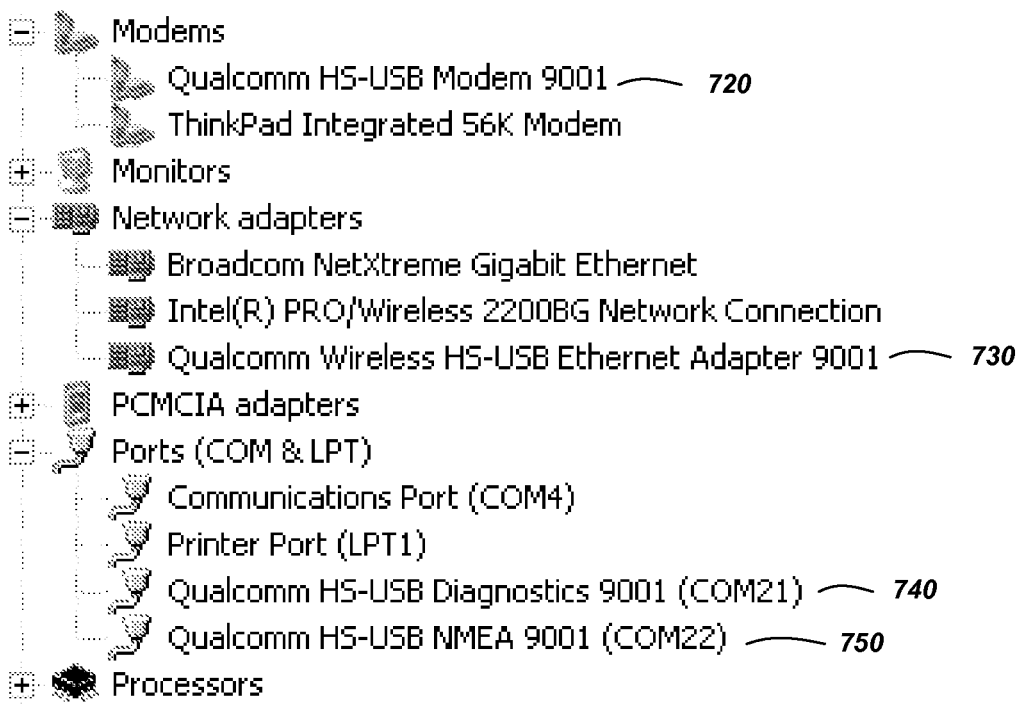
FIG. 6B shows an exemplary control panel displayed by an operating system after a second enumeration process.

FIG. 6A shows an exemplary control panel displayed by an operating system after the first enumeration process. Similarly, FIG. 6B shows an exemplary control panel displayed by an operating system after the second enumeration process. As a non-limiting example, when enumeration is complete, Windows® adds the new device to the Device Manager's display in the Control Panel. When the device is removed from the bus, Windows® removes the device from the Device Manager.

Thus, FIG. 6A shows an exemplary control panel displayed by Windows® after the first enumeration process. A loader 710 port is shown illustrating that the loader driver 162 (FIG. 3) is available to the operating system and other client software. Normal user space applications and the operational driver 164 (FIG. 3) are looking for a device different from the loader 710. Thus, while the USB device 200 has been enumerated in the firmware-loading mode, only the loader driver 162 recognized the USB device 200 for purposes of communication with client software.

FIG. 6B shows an exemplary control panel displayed by Windows® after the second enumeration process indicating a composite enumeration with multiple devices. Now, a diagnostic port 750 and a NMEA (National Marine Electronics Association) port 740 are shown as client software.

In addition, the control panel shows a USB modem 720 and a USB network adaptor 730. Furthermore, the loader 710 port shown in FIG. 6A is now gone from the control panel of FIG. 6B. Of course, those of ordinary skill in the art will recognize that the ports, adaptors, and other functions may be different for different types of USB device 200 using exemplary embodiments of the present invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, controllers, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A USB device, comprising:
   a memory for holding firmware for operation of the USB device;
   a controller for executing the firmware;
   a first device descriptor for enumerating the USB device in a firmware-loading mode for generating a first USB stack during a first stage of a dual-enumeration process; and
   a second device descriptor for enumerating the USB device in an operational mode upon completion of the firmware-loading mode of the first stage of the dual-enumeration process and in response to a re-enumerate indicator generated by the USB device for generating a second USB stack to replace the first USB stack during a second, different stage of the dual-enumeration process;
   wherein firmware comprises:
      first firmware for controlling the firmware-loading mode; and
      second firmware for controlling the operational mode.

2. The USB device of claim 1, wherein the first firmware is on a USB host and for downloading to the memory during the firmware-loading mode.

3. The USB device of claim 1, further comprising a non-volatile memory and wherein the first firmware is for a mode selected from the group consisting of moving to the memory during the firmware-loading mode, or execution by the controller from the non-volatile memory during the firmware-loading mode.

4. The USB device of claim 1, wherein the second firmware is on a USB host and for downloading to the memory during the firmware-loading mode.

5. The USB device of claim 1, USB further comprising a non-volatile memory and wherein the second firmware is for a mode selected from the group consisting of moving to the memory during the firmware-loading mode, or execution by the controller from the non-volatile memory during the operational mode.

6. The USB device of claim 1, wherein the first device descriptor comprises a first vendor identifier and a first product identifier.

7. The USB device of claim 6, wherein the second device descriptor comprises a second vendor identifier and a second product identifier.

8. The USB device of claim 7, wherein the first vendor identifier and the second vendor identifier are the same.

9. The USB device of claim 1, wherein the USB device further includes an antenna and the USB device is for wireless operation as a wide area network device.

10. A USB host for operable coupling to a USB device and comprising computing instruction for execution by a computer, to:
   perform a first stage of a dual-enumeration process of the USB device using a first device descriptor from the USB device after a first portion of firmware has been downloaded by the USB device to generate a first USB stack;
   receive a re-enumerate indicator from the USB device; and
   perform a second, different stage of the dual-enumeration process of the USB device using a second device descriptor from the USB device upon completion of the firmware-loading mode of the first stage of the dual-enumeration process and in response to the re-enumerate indicator after a second, different portion of firmware has been downloaded by the USB device to generate a second USB stack to replace the first USB stack.

11. The USB host of claim 10, wherein the computing instructions for execution by the computer further include instructions to move a first firmware for controlling operations on the USB device during the first enumeration from the USB host to a memory on the USB device during the first enumeration.

12. The USB host of claim 10, wherein the computing instructions for execution by the computer further include instructions to move a second firmware from the USB host to a memory on the USB device during the first enumeration, the second firmware for controlling operations on the USB device during an operational mode after the second enumeration.

13. A system, comprising:
   a USB device, comprising:
      a memory for holding firmware for operation of the USB device;
      a controller for executing the firmware;
      a first device descriptor for enumerating the USB device in a firmware-loading mode for generating a first USB stack during a first stage of a dual-enumeration process; and
      a second device descriptor for enumerating the USB device in an operational mode upon completion of the firmware-loading mode of the first stage of the dual-enumeration process and for generating a second USB stack to replace the first USB stack during a second, different stage of the dual-enumeration process; and
   a USB host operably coupled to the USB device and for controlling the USB device by:
      controlling a first enumeration of the USB device using the first device descriptor; and
      after the first enumeration:
         receiving a re-enumerate indicator from the USB device; and
         controlling a second enumeration of the USB device using the second device descriptor.

14. The system of claim 13, wherein a first firmware is on the USB host for downloading to the memory during the firmware-loading mode.

15. The system of claim 13, wherein the USB device further comprises a non-volatile memory and wherein a first firmware in the non-volatile memory is for a mode selected from the group consisting of moving to the memory during the firmware-loading mode, or execution by the controller from the non-volatile memory during the firmware-loading mode.

16. The system of claim 13, wherein a second firmware for controlling the operational mode is on the USB host and for downloading to the memory during the firmware-loading mode.

17. A method, comprising:
   detecting a USB device on a USB topology;

enumerating the USB device with a first firmware and a first device descriptor of the USB device in a firmware-loading mode for generating a first USB stack during a first stage of a dual-enumeration process;

enabling the USB device for access by first client software in the firmware-loading mode;

downloading a second firmware to a memory of the USB device;

enumerating the USB device with a second device descriptor of the USB device in an operational mode upon completion of the firmware-loading mode of the first stage of the dual-enumeration process and in response to a re-enumerate indicator generated by the USB device for generating a second USB stack to replace the first USB stack during a second, different stage of the dual-enumeration process; and enabling the USB device for access by second client software in the operational mode using the second firmware.

18. The method of claim 17, further comprising operating the USB device with wireless communications in a wide area network device.

19. The method of claim 17, wherein downloading the second firmware comprises an act selected from the group consisting of downloading from a USB host to the memory and downloading from a non-volatile memory on the USB device to the memory.

20. The method of claim 17, wherein enumerating the USB device with the first firmware further comprises downloading the first firmware to the memory.

21. The method of claim 20, wherein downloading the first firmware comprises an act selected from the group consisting of downloading from a USB host to the memory and downloading from a non-volatile memory on the USB device to the memory.

22. The method of claim 17, wherein the first device descriptor comprises a first vendor identifier and a first product identifier.

23. The method of claim 22, wherein the second device descriptor comprises a second vendor identifier and a second product identifier.

24. The method of claim 23, wherein the first vendor identifier and the second vendor identifier are the same.

25. A system, comprising:
means for detecting a USB device on a USB topology;
means for enumerating the USB device with a first firmware and a first device descriptor of the USB device in a firmware-loading mode for generating a first USB stack during a first stage of a dual-enumeration process;

means for enabling the USB device for access by first client software in the firmware-loading mode;

means for downloading a second firmware to a memory of the USB device;

means for enumerating the USB device with a second device descriptor of the USB device in an operational mode upon completion of the firmware-loading mode of the first stage of the dual-enumeration process and in response to a re-enumerate indicator generated by the USB device for generating a second USB stack to replace the first USB stack during a second, different stage of the dual-enumeration process; and means for enabling the USB device for access by second client software in the operational mode using the second firmware.

26. The system of claim 25, further comprising means for operating the USB device with wireless communications in a wide area network device.

27. The system of claim 25, wherein the means for downloading the second firmware comprises means selected from the group consisting of means for downloading from a USB host to the memory and means for downloading from a non-volatile memory on the USB device to the memory.

28. The system of claim 25, wherein the means for enumerating the USB device with the first firmware further comprises means for downloading the first firmware to the memory.

29. The system of claim 28, wherein the means for downloading the first firmware comprises means selected from the group consisting of means for downloading from a USB host to the memory and means for downloading from a non-volatile memory on the USB device to the memory.

30. The system of claim 25, wherein the first device descriptor comprises a first vendor identifier and a first product identifier.

31. The system of claim 30, wherein the second device descriptor comprises a second vendor identifier and a second product identifier.

32. The system of claim 31, wherein the first vendor identifier and the second vendor identifier are the same.

* * * * *